United States Patent [19]
Lin

[11] Patent Number: 5,248,858
[45] Date of Patent: Sep. 28, 1993

[54] AUTOMOTIVE MUFFLER AND DUST CATCHER ASSEMBLY

[76] Inventor: Chi-Hsiang Lin, No. 40-1, Hsi Di Liao, Hsiu Lin Tsun, Min Hsiung Hsien, Chia I, Taiwan

[21] Appl. No.: 865,250

[22] Filed: Apr. 8, 1992

[51] Int. Cl.$^5$ .............................................. F01N 5/00
[52] U.S. Cl. ................................... 181/212; 181/279; 55/239; 55/429
[58] Field of Search ..................... 181/211, 212, 279; 55/239, 429

[56] References Cited

U.S. PATENT DOCUMENTS

| | | | |
|---|---|---|---|
| 1,170,438 | 2/1916 | Fahrney | 55/429 |
| 1,897,370 | 2/1933 | Garner | 55/239 |
| 2,437,592 | 3/1948 | Brown | 55/239 |
| 2,911,730 | 11/1959 | Schaub et al. | 55/429 |
| 3,282,047 | 11/1966 | Wertheimer | 55/229 |
| 3,778,979 | 12/1973 | Friedling et al. | 55/239 |
| 5,123,945 | 6/1992 | Lin | 55/429 |

FOREIGN PATENT DOCUMENTS 0050692 12/1980 Japan ........................... 55/239

Primary Examiner—Michael L. Gellner
Assistant Examiner—Eddie C. Lee
Attorney, Agent, or Firm—Bacon & Thomas

[57] ABSTRACT

An automotive muffler and dust catcher assembly comprising a muffler attached to a dust catcher, the muffler having an intake pipe for guiding a motor vehicle's exhaust emission into the dust catcher, and an outlet pipe for exhaust of intake gas, wherein the motor vehicle's exhaust emission is guided into the muffler by the intake pipe, forming into a turbulent flow of gas to stir up and heat water contained in the dust catcher and permitting particles in the exhaust emission to be carried in the water and gathered in a non-woven dust bag inside the dust catcher, and permitting the vibrating waves produced by the exhaust explosion of the motor vehicle's exhaust emission to be gradually absorbed by the moving flow of water in the dust catcher.

1 Claim, 2 Drawing Sheets

AUTOMOTIVE MUFFLER AND DUST CATCHER ASSEMBLY

BACKGROUND OF THE INVENTION

1. Field of the Invention

The present invention relates to a muffler and dust catcher assembly, and more particularly, the present invention relates to an automotive muffler and dust catcher assembly for deadening noises and removing dust from the exhaust pipe of a motor vehicle.

2. Description of Prior Art

An automotive muffler assembly is an exhaust device containing two perforated pipes packed in a sound-deadening material and connected between the front and rear exhaust pipes of a motor vehicle. Because this structure of automotive muffler assembly affects the performance of the cylinders of a motor vehicle in exhausting emissions, the horsepower of a motor vehicle is relatively reduced. Furthermore, various catalytic conversion devices are known and used in motor vehicles to eliminate or reduce air pollution. However, catalytic conversion devices are not suitable for the emissions of dieselized motor vehicles. Therefore, dieselized motor vehicles cause severe air pollution problem.

SUMMARY OF THE INVENTION

The present invention has been accomplished under the aforesaid circumstances. One object of the present invention is to provide an automotive muffler and dust catcher assembly which guides a motor vehicle's exhaust emission to stir up water in a dust catcher into a turbulent flow for eliminating vibrating waves from the exhaust explosion of the exhaust emission.

Another object of the present invention is to provide an automotive muffler and dust catcher assembly which utilizes the heat from the motor vehicle's exhaust emission to heat water into steam for binding particles together and causing the particles in the motor vehicle's exhaust emission to be carried in water and gathered in a non-woven dust bag inside a dust catcher.

BRIEF DESCRIPTION OF THE DRAWINGS

The foregoing and other objects, features and advantages of the present invention will be best understood from the following description, the appended claims and the accompanying drawings in which:

DETAILED DESCRIPTION OF THE PREFERRED EMBODIMENT

Figure 1:
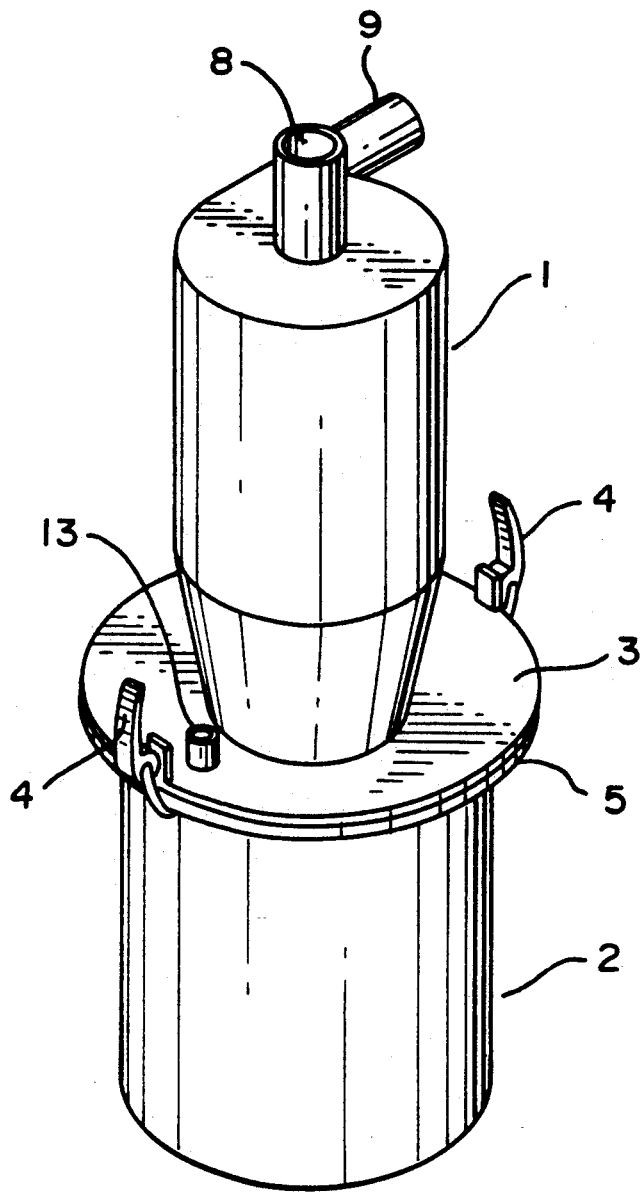
FIG. 1 is an elevational view of the preferred embodiment of the muffler and dust catcher assembly of the present invention.
Figure 3:
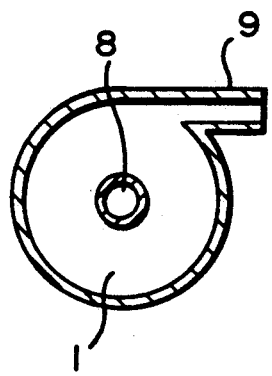
FIG. 3 is a cross section taken on line A—A of FIG. 2.
Figure 2:
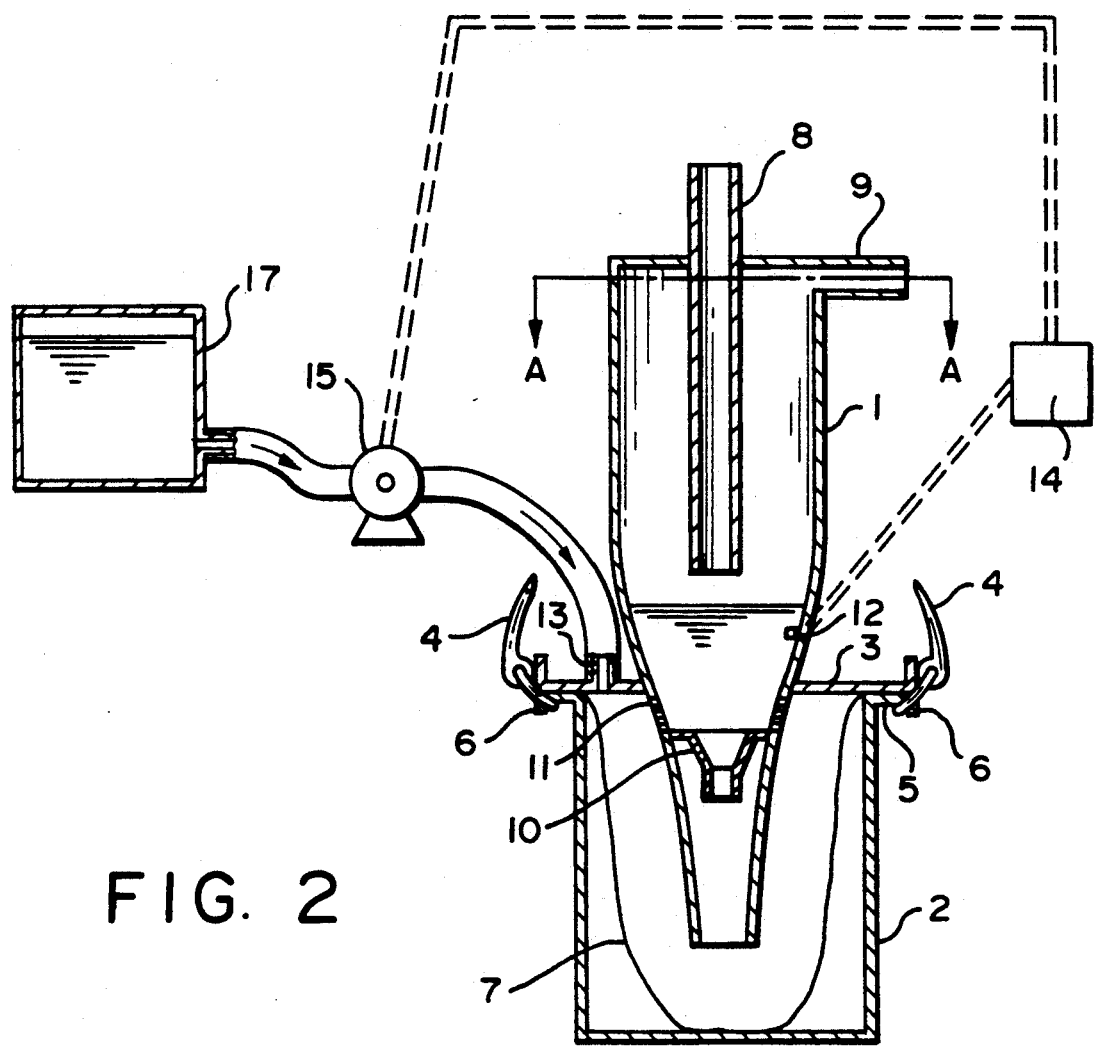
FIG. 2 is a longitudinally sectional view thereof.

Referring to the annexed drawings in detail, a muffler and dust catcher assembly is generally comprised of a muffler 1 and a dust catcher 2. The muffler 1 is made in a cylindrical shape having a ring 3 externally attached to a tapered bottom end thereof at a suitable location. The ring 3 of the muffler 1 has snap fasteners 4 attached to the peripheral edge thereof and equally spaced from one another. The dust catcher 2 is made from a cylindrical casing having a closed bottom end, and an open top end for inserting the tapered bottom end of the muffler 1. The opened top end of the casing of the dust catcher has an outward horizontal top flange 5 formed on the top edge thereof. The outward top flange 5 of the dust catcher 2 has hooks 6 on the bottom edge thereof at locations corresponding to the snap fasteners 4. By fastening the snap fasteners 4 to the hooks 6, the muffler 1 is secured to the dust catcher 2 with the ring 3 covered over the outward top flange 5 (See FIG. 2). A non-woven dust bag 7 is placed in the dust catcher 2 with the border edge thereof retained in between the ring 3 of the muffler 1 and the outward top flange 5 of the dust catcher 2. The muffler 1 further comprises an outlet pipe 8 on the top edge thereof, and an intake pipe 9 tangent to the peripheral wall adjacent to the top edge thereof for guiding a motor vehicle's exhaust emission into the muffler 1. Because the intake pipe 9 is tangent to the peripheral wall of the muffler 1, see FIG. 3, exhaust emission from a motor vehicle is guided to swirl downwards along the inner wall surface of the muffler 1. Referring to FIG. 2 again, a hopper-shaped water guide 10 is fastened inside the reducing bottom end of the muffler 1 at a location below the ring 3. A water level detector 12 is fastened inside the muffler 1 at a location between the ring 3 and the outlet pipe 8. A plurality of small through holes 11 are made on the peripheral wall of the muffler 1 at locations between the hopper-shaped water guide 10 and the ring 3. A water intake hole 13 is provided on the ring 3 for filling cooling water into the dust catcher 2.

The muffler and dust catcher assembly is fastened inside a motor vehicle at a suitable location with the water intake hole 13 connected to a water tank, and with the intake pipe 9 connected to the motor vehicle's exhaust pipe. Before operation, water is pumped from the water tank into the dust catcher 2. The water level detector 12 automatically detects the level of water in the dust catcher 2 and the muffler 1. When the water level of the contained water in the dust catcher 2 and the muffler 1 dropped below a predetermined level, the water level detector 12, through a control 14, automatically turns on a water pump 15 to pump water from a water tank 17 into the dust catcher 2 to make up for the deficiency. When the motor vehicle is started or during the running of the motor vehicle, exhaust emission of the motor is guided into the muffler 1 through the intake pipe 9. By means of the guiding of the intake pipe 9 which is tangent to the peripheral wall of the muffler 1, intake gas from the motor exhaust emission rotates downwards along the inner wall surface of the muffler 1 to swirl the contained water, causing particles in rotary intake gas to be carried in the swirling flow of water. At the same time, the vibrating waves produced by the exhaust explosion of the motor vehicle's exhaust emission are gradually absorbed by the swirling flow of water. During the operation of the muffler and dust catcher assembly, the water contained in the dust catcher 2 is simultaneously heated by hot engine emission and partly turned into steam. Particles in the intake gas will also be bound together by steam in the muffler 1 and drop into the dust catcher 2.

The hopper-shaped water guide 10 guides dust-contained flow of water to enter the dust catcher 2 permitting the particles therein to be accumulated in the dust catcher 2. The hopper-shaped water guide 10 simultaneously prohibits the swirling flow of water in the muffler 1 from stirring up the dust-contained water in the dust catcher 2, and therefore the return flow of water through the small through holes 11 back into the muffler 1 contains less impurities.

After a certain length of time in service (preferably miles operated within 1,000 kilometers), the non-woven dust bag 7 shall be replaced, and the dust catcher 2 shall be cleaned. The dust catcher 2 can be conveniently detached from the muffler 1 by unfastening the snap fasteners 4. Once replacement has been made, the dust catcher 2 is attached to the muffler 1 again and fixedly retained in place by fastening up the snap fasteners 4.

As illustrated, the present invention is to provide an automotive muffler and dust catcher assembly which utilizes a motor vehicle's exhaust emission to stir up water into a turbulent flow for eliminating the vibrating waves from the exhaust explosion, and which utilizes the heat from a motor vehicle's exhaust emission to heat water into steam for binding the particles contained in the emission and permitting the particles to be gathered in a non-woven dust bag.

What is claimed is:

1. An automotive muffler and dust catcher assembly comprising:

a dust catcher, said dust catcher comprising a cylindrical casing having a closed bottom end and an open top end, and a non-woven dust bag placed inside said cylindrical casing for catching exhaust emission particles, said top end of said casing having an outward horizontal flange around a peripheral edge thereof, said outward horizontal flange having a plurality of hooks equally spaced on a bottom edge thereof; and a muffler attached to said dust catcher, said muffler comprising a cylindrical casing having a ring externally attached to a tapered bottom end thereof, said ring including a water intake hole for said dust catcher, said tapered bottom end being inserted through the open top end of said dust catcher with said ring attached to said outward horizontal flange, said ring having respective snap fasteners releasably fastened to said hooks, the cylindrical casing of said muffler having an intake pipe tangent to a peripheral wall thereof for guiding exhaust emission into said muffler, an outlet pipe on a top edge thereof for exhaust of intake gas, a hopper-shaped water guide fastened inside said tapered bottom end at a location below said ring, a water level detector disposed inside said muffler at a location between said ring and said outlet pipe for automatically controlling a water pump in pumping water from said water tank into said water intake hole of said dust catcher and said muffler to a predetermined water level, and a plurality of small through holes formed on the cylindrical casing of said muffler at locations between said hopper-shaped water guide and said ring.

* * * * *